(12) United States Patent
Helfer et al.

(10) Patent No.: US 11,970,215 B2
(45) Date of Patent: Apr. 30, 2024

(54) UNIVERSAL HIGH EXPANDABLE FILLING MEMBER

(71) Applicant: Zephyros, Inc., Romeo, MI (US)

(72) Inventors: Luc Helfer, Rosheim (FR); Alain Kuntz, Selestat (FR)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 17/609,078

(22) PCT Filed: Jun. 4, 2020

(86) PCT No.: PCT/EP2020/065509
§ 371 (c)(1),
(2) Date: Nov. 5, 2021

(87) PCT Pub. No.: WO2020/245286
PCT Pub. Date: Dec. 10, 2020

(65) Prior Publication Data
US 2022/0227429 A1    Jul. 21, 2022

(30) Foreign Application Priority Data

Jun. 7, 2019 (EP) .................................... 19179122

(51) Int. Cl.
*B62D 25/24* (2006.01)
*B62D 29/00* (2006.01)

(52) U.S. Cl.
CPC ........... *B62D 29/002* (2013.01); *B62D 25/24* (2013.01)

(58) Field of Classification Search
CPC ...... B62D 29/002; B62D 25/24; B62D 25/00; B60R 13/08; B60R 19/22

USPC .................................................... 296/187.09
See application file for complete search history.

(56) References Cited

U.S. PATENT DOCUMENTS

| | | | |
|---|---|---|---|
| 5,509,247 A * | 4/1996 | Fortez | B60R 13/0225 52/630 |
| 5,575,526 A | 11/1996 | Wycech | |
| 5,755,489 A | 5/1998 | Rossman et al. | |
| 5,766,719 A | 6/1998 | Rimkus | |
| 5,932,680 A | 8/1999 | Heider | |
| 6,131,897 A | 10/2000 | Barz et al. | |
| 8,758,535 B2 * | 6/2014 | White | B62D 29/004 156/293 |
| 8,925,992 B2 | 1/2015 | Schafer | |

(Continued)

FOREIGN PATENT DOCUMENTS

| CN | 1809870 A | 7/2006 |
|---|---|---|
| CN | 1812909 A | 8/2006 |

(Continued)

OTHER PUBLICATIONS

PCT International Preliminary Report on Patentability dated Dec. 16, 2021, Application No. PCT/EP2020/065509.

(Continued)

*Primary Examiner* — Pinel E Romain
(74) *Attorney, Agent, or Firm* — The Dobrusin Law Firm, PC

(57) ABSTRACT

The present invention relates generally to a cavity filling system for e.g. noise reduction, sealing and/or stiffening. The cavity is part of an automotive vehicle structure. The present invention further relates to an automotive vehicle structure with a multitude of cavities and a filling system.

16 Claims, 2 Drawing Sheets

(56) References Cited

U.S. PATENT DOCUMENTS

| | | |
|---|---|---|
| 10,525,905 B2 | 1/2020 | Iwata |
| 10,703,036 B2 | 7/2020 | Quaderer |
| 2004/0138321 A1* | 7/2004 | Hashimoto ............ C08J 9/0061 |
| | | 521/134 |
| 2005/0127145 A1 | 6/2005 | Czaplicki et al. |
| 2006/0118355 A1 | 6/2006 | Blomeling et al. |
| 2007/0145755 A1 | 6/2007 | Shioya et al. |
| 2009/0223739 A1 | 9/2009 | Duffin |
| 2011/0024933 A1* | 2/2011 | Monnet .................. B60R 13/08 |
| | | 264/138 |
| 2012/0318452 A1 | 12/2012 | Bradley |
| 2013/0087406 A1 | 4/2013 | Franey et al. |
| 2013/0241226 A1 | 9/2013 | Shantz et al. |
| 2014/0087126 A1 | 3/2014 | Quaderer |
| 2017/0158252 A1* | 6/2017 | Milne .................. B62D 29/043 |
| 2019/0126855 A1* | 5/2019 | Ulmann .................. B60R 13/08 |

FOREIGN PATENT DOCUMENTS

| | | |
|---|---|---|
| CN | 101209699 A | 7/2008 |
| CN | 102083655 A | 6/2011 |
| CN | 103569217 A | 2/2014 |
| CN | 107249937 A | 10/2017 |
| WO | 2005/002950 A2 | 1/2005 |
| WO | 2016/176459 A1 | 11/2016 |

OTHER PUBLICATIONS

PCT International Search Report & Written Opinion dated Aug. 28, 2020, Application No. PCT/EP2020/065509.

Chinese First Office Action & Search Report dated Nov. 6, 2023, Application No. 202080041953.6.

* cited by examiner

UNIVERSAL HIGH EXPANDABLE FILLING MEMBER

FIELD

The present invention relates generally to a cavity filling system for e.g. noise reduction, sealing and/or stiffening. The cavity is part of an automotive vehicle structure. The present invention further relates to an automotive vehicle structure with a multitude of cavities and a filling system.

BACKGROUND

To fill cavities with an expandable material which is provided on a carrier is well known in the state in the art. There are numerous examples of such filling systems, which are tailor made for a specific application. However, there is a constant need for simpler designs, which can be used universally in many if not all cavities of an automotive structure.

It was therefore the problem of the present invention to provide a cavity filling system that is simple designed and which can be used universally in many if not all cavities of an automotive structure.

SUMMARY

The problem is attained with a cavity filling system comprising a structure of an automotive vehicle cavity and a filling member the filling member including: i. a carrier member comprising a first and a second surface, ii. a mass of expandable material located on the surface of the carrier member iii. an attachment attached to the carrier member, the expandable material or both and locating the filling member relative to one sidewall of the automotive vehicle cavity; wherein upon expansion the mass of expandable material forms a foam that occupies a volume that is at least 500% of the volume occupied by the original unexpanded mass of expandable material and the mass expands from the surface into the cavity and wherein the carrier member is elastically and/or plastically deformable so that it adapts to the shape of the cavity, preferably one sidewall of the cavity.

DETAILED DESCRIPTION

Figure 1A:
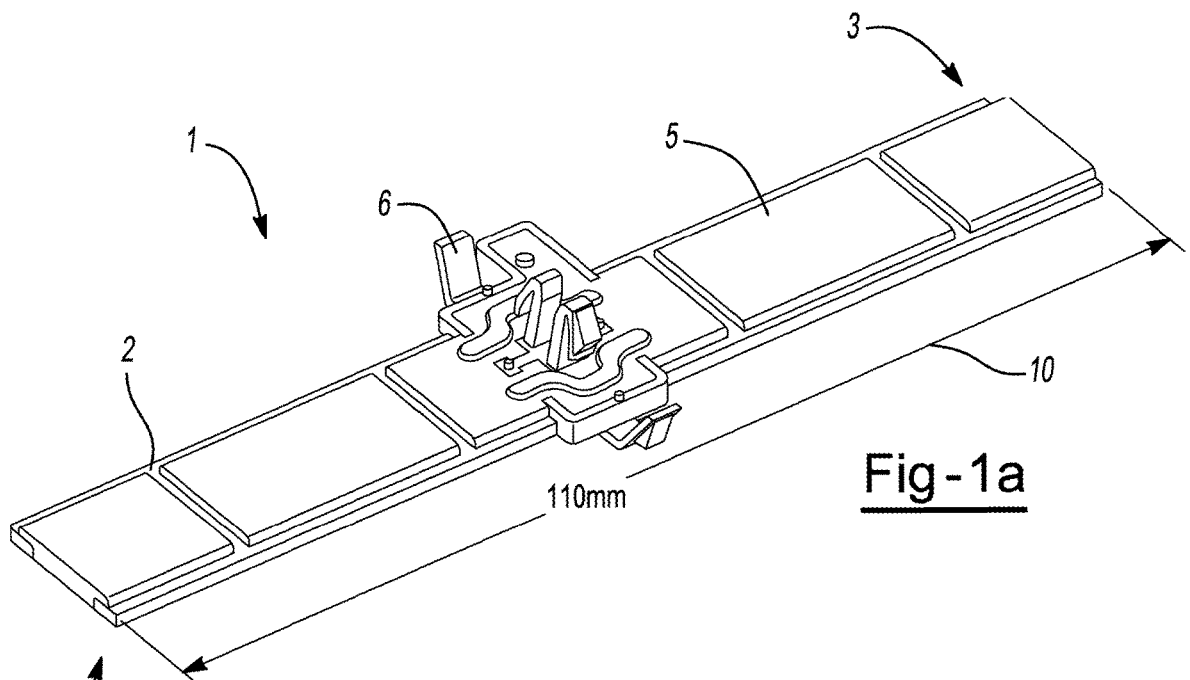
FIGS. 1 *a*-1*c* each depict a filling member, wherein the three depicted filling elements are a kit.

The present invention is predicated upon the provision of a filling member suitable for providing sealing, noise reduction and/or structural improvement to a structure comprising a cavity. The filling member fills a cavity, particularly its cross section, at least partially, so that a seal is provided, noise is reduced and/or the stiffness of the structure and/or the energy absorption during a crash is improved.

It is contemplated that the filling member may be employed in conjunction with a variety of structures of various vehicles such as boats, trains, trucks, buses, automobiles and/or aero-planes. It has been found, however, that the member is particularly suitable for application to structures or assemblies of transportation vehicles such as automotive vehicles. Generally, it is contemplated that the member may be applied to various structures such as components of a body, a frame, an engine, a hood, a trunk, a bumper, a pillar, a door or combinations thereof or the like of an automotive vehicle.

According to the present invention, the filling system comprises a carrier member which carries the expandable material. This carrier member can, for example, be made of a plastic-, a metal-material or a combination thereof or the like. Preferably, the carrier is a strip shaped piece of material, which preferably comprises a much larger length and width in comparison to its thickness. Even more preferred, the length of the material is larger than the width, preferably significantly larger. Preferably, the carrier is ruler-shaped. The carrier is preferably provided at one of the surfaces of the cavity and more preferably extends, at least essentially, parallel to this surface. Due to the plastic and/or elastic deformability, the carrier is preferably adapted to the shape of the cavity, preferably one sidewall of the cavity. The deformation can take place prior and/or during the expansion of the expandable material.

Furthermore, the filling member comprises a mass of expandable material. Upon expansion, the expandable material can, if desired, be configured to substantially entirely fill a section of a cavity in which the member has been placed. In such an embodiment, the expandable material typically expands to form a foam that spans across a cross-section of the cavity for inhibiting or prohibiting the passage of mass (e.g., dust and debris) and or sound (e.g., noise) through the cavity.

The mass of expandable material may be shaped in a variety of different configurations and there may be multiple different masses of expandable material, which are spaced apart from each other, preferably equidistantly. Preferably, the expandable material, i.e. the material prior to expansion, is also strip shaped; i.e. it preferably comprises a much larger length and width in comparison to its thickness. Preferably, the expandable material is provided on one surface of the carrier, preferably the surface that is defined by the length and the width of the carrier. Preferably, this surface extends away from the surface of the cavity to which the carrier is attached.

It is contemplated that the mass of expandable material may be formed into a variety of shapes and configurations. The walls of the mass may be planar or contoured and the mass may be geometric or non-geometric or a combination thereof. The mass of expandable material may be generally shaped as a polyhedron having sidewalls that are respectively square and/or rectangular.

The volume of the mass of expandable material may be relatively large or relatively small prior to expansion thereof. As such, the size or volume of the mass should not be limited unless otherwise specifically stated. Generally, however, preferred embodiments of the invention have a mass of expandable material with a volume that is greater than about 0.5 cm$^3$, more typically greater than about 1.0 cm$^3$, and even more typically greater than about 1.5 cm$^3$ and a volume that is less than about 10 cm$^3$, more typically less than about 4.0 cm$^3$ and even more typically less than about 2.0 cm$^3$.

A variety of expandable materials may be used for the mass of expandable material of the present invention. In one embodiment, the material may be formed of a heat activated material and may flow, cure (e.g., be thermosettable), foam or a combination thereof upon exposure to heat. The expandable material may be generally dry to the touch and substantially tack free or may be tacky and, in either situation, may be shaped in any form or desired pattern, placement, or thickness, but is preferably of substantially uniform thickness. Exemplary expandable materials are L-7102, L-2806, L-2810, L-2811, L-2820, L-2821 and L-7220 foam available through L&L Products, Inc. of Romeo, Michigan. Another exemplary expandable material is disclosed in U.S. patent application Ser. No. 10/867,835 incorporated herein by reference for all purposes.

Though other heat-activated materials are possible, a preferred heat activated material is an expandable polymer or plastic, and preferably one that is foamable. Particularly preferred materials are epoxy-based, acrylate-based or acetate-based foams, which may be structural, sealing, sound damping, sound absorbing, sound attenuating or a combination thereof. For example, and without limitation, the foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based or otherwise based sealing, baffling or acoustic foams are known in the art and may employed in the present invention. A typical foam includes a polymeric base material, such as an epoxy resin or ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link upon curing, which typically makes the material incapable of further flow (e.g., thermoset).

One advantage of the preferred foam materials over prior art materials is that the preferred materials can be processed in several ways. The preferred materials can be processed by injection molding, extrusion, compression molding or with a mini-applicator. This enables the formation and creation of part designs that exceed the capability of most prior art materials.

While preferred materials have been disclosed, other materials may be used as well, particularly materials that are heat-activated or otherwise activated by an ambient condition (e.g. moisture, pressure, time, chemical reaction or the like) and cure in a predictable and reliable manner under appropriate conditions for the selected application. Of course, the material may also be formed of non-activatable materials, non-expandable materials or otherwise. Thus, upon activation, the material may soften, cure and expand; soften and cure only; cure only; soften only; or may be non-activatable.

One example of an expandable material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and U.S. Pat. No. 5,932,680, (incorporated by reference). In general, desired characteristics of the material can include adhesion durability properties or the like, although such properties are not necessarily required. Generally, it is desirable that the material does not generally interfere with the materials systems employed by automobile manufacturers or other manufactures.

Other exemplary expandable materials can include combinations of two or more of the following: epoxy resin, polystyrene, styrene butadiene-styrene (SBS) block copolymer, butadiene acrylo-nitrile rubber, amorphous silica, glass microspheres, azodicarbonamide, urea, dicyandiamide. Examples of such materials are sold under the tradename SIKAELASTOMER, SIKAREINFORCER and SIKABAFFLE and are commercially available from the Sika Corporation, Madison Heights, MI.

In applications where the material is a heat activated, thermally expanding and/or foaming material, an important consideration involved with the selection and formulation of the material forming the foam is the temperature at which a material reaction or expansion, and possibly curing, will take place. Typically, certain expandable material ingredients become reactive at higher processing temperatures, such as those encountered in an automobile assembly plant, when the material is processed and/or activated along with the automobile components at elevated temperatures or at higher applied energy levels, e.g., during paint or e-coat baking or curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, various different blowing agents or blowing agent activators can be incorporated into the composition to cause expansion at different temperatures outside the above ranges. Generally, suitable expandable materials have a volumetric range of expansion ranging from approximately 0 to over 1000 percent. For example a mass of expandable material may expand to form a foam that occupies a volume that is (e.g., is at least partially located within) at least 150%, 200%, 500%, 1000%, 1500%, 2000% or 3000% of the volume occupied by the original unexpanded mass of expandable material.

The material or medium may be at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) placed along the mold through the use of baffle technology; a die-cast application according to teachings that are well known in the art; pumpable application systems which could include the use of a baffle and bladder system; and sprayable applications.

Additionally, the filling member comprises an attachment attached to the carrier member, the expandable material or both and locating the filling member relative to one sidewall of the automotive vehicle cavity. As such, the attachment may be formed, molded or shaped of the same material and more preferably as one part of the carrier member and/or the expandable material or, alternatively, may be a separate member that is attached or connected to one or both of the expandable material and the carrier member. The attachment may also be an attachment medium such as an adhesive or magnetic medium. Preferably, the attachment is elastically deformable, so that it can be compresses during installation of the filling member in the cavity and then expands again at least partially, when the filling member has reached its final position in the cavity of the structure.

The carrier member has a longitudinal extension and the attachment is preferably provided in the middle of the longitudinal extension. the attachment is preferably a fastener that extends into an opening of the structure for at least partially attaching the filling member to the structure of the vehicle.

The carrier member may comprise pre-tensioning means, which is elastically deformed during installation. The pre-tensioning means can be one piece with the carrier and can be, for example one or more wings, which extend from the carrier.

Preferably, the mass of expandable material is provided in segments which are spaced apart, more preferably equidistantly. The segments preferably have the same shape, but may differ in size, particularly in their longitudinal extension.

The problem is also solved with a system, wherein the filling members are provided as a kit of multiple identical filling members (1) which only differ in their longitudinal extension.

The disclosure regarding each filling element is also applicable for this subject matter of the present invention.

According to this embodiment, the filling elements are provided as a kit which are essentially identical except for their longitudinal extension and the amount of expandable mass provided on the respective carrier. This kit allows cover all cavity filling purposes in a vehicle. There is no need for complicated tailor made filling elements for a certain specific application. The skilled person selects among the members of the kit the most suitable one and apply it to the respective cavity. Preferably, the kit comprises 2-4 members, all differing in their longitudinal extension and the amount of expandable mass. These 2-4, preferably 3 members are sufficient to fill all cavities in the structure of a vehicle, preferably an automotive vehicle.

Preferably, the ratio of mass in kg and length of the filling member in meter off the filling member is 5-10, preferably 6-9.5, preferably 6.25-8.33.

The filling element is inserted into the cavity to be filled and prior and/or during insertion, the flexible carrier member is plastically and7or elastically deformed. The insertion can be manually or automatically, for example by a robot.

The problem is also solved by a method to produce the inventive kit, wherein one single mold-machine is utilized for all members of the kit and wherein the mold machine is provided with chambers and wherein chambers are opened or closed depending on the desired longitudinal extension of the carrier member and/or the desired amount of expandable mass.

The invention is now further explained according to the Figures. These explanations apply to all embodiments of the present invention. The explanations do not limit the scope of the present invention.

FIGS. 1 a-c each depict one embodiment of a filling member 1. The three embodiments 1a-c are three members of a kit. Every filling element comprises a carrier member, which is strip- or ruler-shaped carrier member 1, which has in the present case a longitudinal extension 10 of 110 mm. The carrier member 1 can be made from a plastic material, for example by extrusion or moulding. The carrier element can also be made from a metal material, preferably steel. The carrier element has a first surface 3 and an opposed second surface 4. On the first surface 3, and only here, the expandable mass 5 is provided, here in five segments, which are provided separate from each other and equidistantly along the first surface 3. The segments are here provided strip-shaped. The segments preferably have all the same width and length. In the present case 8 *g* of expandable material is provided. Relative to the longitudinal extension 10 in the center, attachment means 6 are provided, which fix the filling element 1 to the sidewall of a cavity, particularly prior to expansion of the expandable material. As depicted, the filling element 1 is flexible and can be deformed elastically and/or plastically, so that its shape can adapt to the shape of the cavity, particularly to the sidewall of the cavity to which the filling element is attached.

Figure 1B:
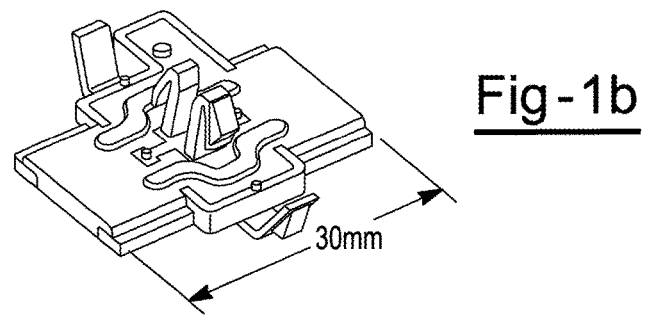
Figure 1C:
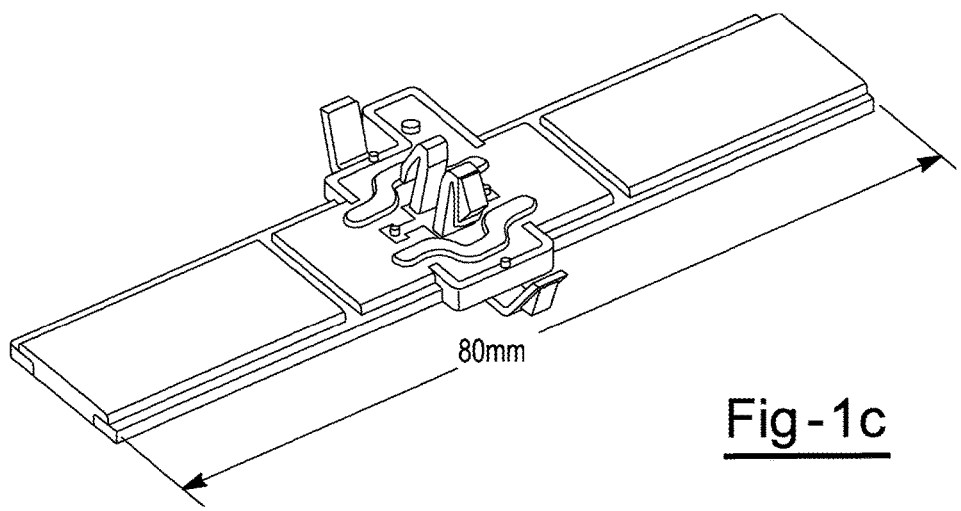

The three embodiments according to FIGS. 1a-c are all designed identically but differ in their length and by the amount of expandable material. The three embodiments are an example for a kit, which is sufficient for all filling purposes of the structure for a vehicle. Due to this identical and simple design, the cost for providing the filling elements and their stock can be reduced significantly.

Figure 2:
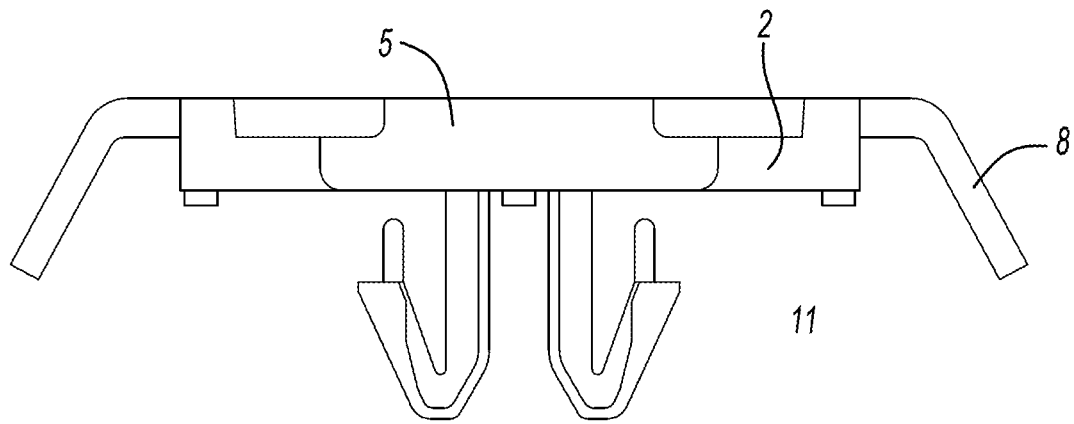
FIG. 2 shows a cross section of the filling member and the attachment means

FIG. 2 shows a cross section of the filling member 1 and the attachment 6. It can be seen that the carrier element comprises at both sides pre-tensioning means 8, here in the form of elastic wings. The attachment means 6 comprises here hooks 11, which are inserted into a hole 14 in the structure of the vehicle. During insertion, the hooks are first elastically compressed and, as soon as they have passed the hole expand again. The pre-tensioning means force the hook against the structure of the vehicle.

Figure 3:
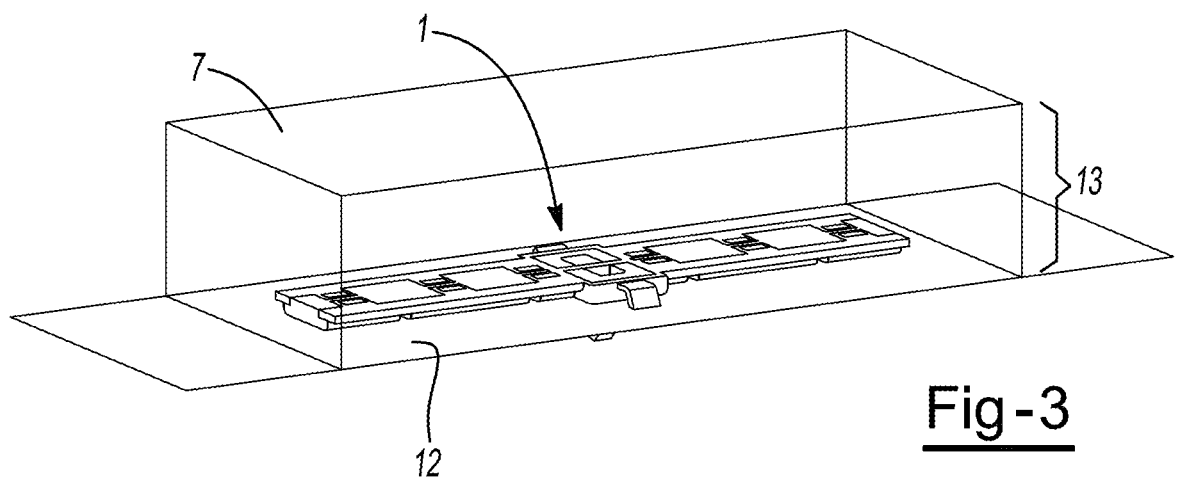
FIG. 3 shows the filling element in a cavity

FIG. 3 shows the filling element 1 in a cavity 7 of the structure of a vehicle. It can be seen that the filling element is attached to the surface of one sidewall 12 of the cavity via the attachment means 6. Out of several different embodiments of the kit, a filling element is selected that is slightly smaller than the longitudinal extension of the cavity. The expansion limits of the expandable material is indicated by reference sign 13 and s preferably 4-30 mm. For cavities higher than that a different filling element has to be chosen.

Figure 4:
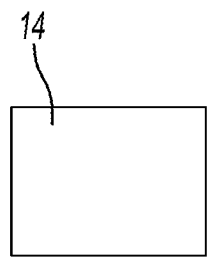
FIG. 4 shows the normalized hole for all cavities of a vehicle

FIG. 4 depict the normalized hole, which is identical for all cavities in the vehicle structure. The cross section of the hole is preferably square or rectangular.

LIST OF REFERENCE SIGNS 1 filling member
2 carrier member
3 first surface
4 second surface
5 mass of expandable material
6 attachment, attachment means
7 cavity
8 pre-tensioning means
9 sidewall of the cavity 7
10 longitudinal extension
11 hook
12 sidewall of the cavity to which the filling member 1 is attached
13 expansion limits
14 hole in the structure to fix the filling member 1

The invention claimed is:

1. A cavity filling system comprising a structure of an automotive vehicle cavity with a shape and a filling member the filling member including:
i) a carrier member comprising a first and a second surface and having a longitudinal extension;
ii) a mass of expandable material located on the first surface; of the carrier member;
iii) an attachment attached to the carrier member, the expandable material or both and locating the filling member relative to one sidewall of the automotive vehicle cavity;
wherein upon expansion the mass of expandable material forms a foam that occupies a volume that is at least 500% of the volume occupied by the original unexpanded mass of expandable material and the mass expands from the first surface into the cavity and wherein the carrier member is elastically and/or plastically deformable so that the carrier member adapts to the shape of the automotive vehicle cavity, preferably one sidewall of the cavity and further wherein a ratio of mass in kg and length of the filling member in meters off the filling member is 5:10, preferably 6:9.5, preferably 6.25:8.33.

2. The system of claim 1, wherein the carrier member and/or the attachment comprises pre-tensioning means.

3. The system of claim 1, wherein the mass of expandable material is provided in segments which are spaced apart.

4. The system of claim 1, wherein the carrier member has a longitudinal extension and the attachment is provided in a middle portion of the longitudinal extension.

5. The system of claim 1, wherein the mass is only provided on a surface that is opposite from the sidewall of the cavity.

6. The system of claim 1, wherein the mass of expandable material expands to form a foam that occupies a volume that is at least 1500% of the volume occupied by the original unexpanded mass of expandable material.

7. The system of claim 1, wherein the volume of each segment of the mass of expandable material is greater than 1 $cm^3$ but less than 2 $cm^3$.

8. The system of claim 7, wherein the ratio of mass in kg and length of the filling member in meters off the filling member is 5:10, preferably 6:9.5, preferably 6.25:8.33.

9. The system of claim 1, wherein the expandable material is a heat activated thermosetting material that foams, expands and cures upon exposure to temperature in an e-coat or bake oven.

10. The system of claim 1, wherein the attachment is a fastener that extends into an opening of the structure for at least partially attaching the filling member to the structure.

11. The system of claim 1, wherein the filling members are provided as a kit of multiple identical filling members which only differ in their longitudinal extension.

12. A method to produce a kit according to claim 11, wherein one single mold-machine is utilized for all members of the kit and wherein the mold machine is provided with chambers and wherein chambers are opened or closed depending on the desired longitudinal extension of the carrier member, the desired amount of expandable mass, or both.

13. A cavity filling system comprising a structure of an automotive vehicle cavity with a shape and a filling member the filling member including:
   i) a carrier member comprising a first and a second surface and having a longitudinal extension;
   ii) a mass of expandable material located on the first surface; of the carrier member;
   iii) an attachment attached to the carrier member, the expandable material or both and locating the filling member relative to one sidewall of the automotive vehicle cavity;
   wherein upon expansion the mass of expandable material forms a foam that occupies a volume that is at least 500% of the volume occupied by the original unexpanded mass of expandable material and the mass expands from the first surface into the cavity and wherein the carrier member is elastically and/or plastically deformable so that the carrier member adapts to the shape of the automotive vehicle cavity, with a multitude of cavities in at least some of the cavities, wherein each cavity being filled comprising a multitude of holes all being normalized for the attachment preferably one sidewall of the cavity wherein the longitudinal extension of the filling members is 0.3-1.1 Meters.

14. The automotive vehicle according to claim 13, wherein the ratio of mass in kg and length of the filling member in meters of all filling members of the kit is 5:10, preferably 6:9.5, preferably 6.25:8.33.

15. An automotive vehicle structure with a multitude of cavities and a filling system in at least some of the cavities, wherein the filling members are provided as a kit of multiple identical filling members which at least partially wherein a ratio of mass in kg and length of the filling member in meters of all filling members of the kit is 5:10, preferably 6:9.5, preferably 6.25:8.33.

16. The automotive vehicle according to claim 15, wherein the longitudinal extension of the filling members is 0.3-1.1 meters.

* * * * *